United States Patent [19]

Gayle

[11] Patent Number: 5,060,906

[45] Date of Patent: Oct. 29, 1991

[54] CONSOLE BRACE

[75] Inventor: Herbert Y. Gayle, Portland, Tex.

[73] Assignee: Rodney Popejoy, Corpus Christi, Tex. ; a part interest

[21] Appl. No.: 165,910

[22] Filed: Mar. 9, 1988

[51] Int. Cl.⁵ .............................................. A47B 97/00
[52] U.S. Cl. .................................. 248/503; 248/311.2; 248/201; 248/300
[58] Field of Search ...................... 248/503, 503.1, 500, 248/506, 311.2, 201, 194, 300; 297/411, 194; 211/13, 71; 108/44

[56] References Cited

U.S. PATENT DOCUMENTS

| | | | |
|---|---|---|---|
| 1,171,667 | 2/1916 | Schroth | 248/300 |
| 1,740,727 | 12/1929 | Dunlap | 248/300 X |
| 2,328,421 | 8/1943 | Carlson et al. | 248/300 |
| 2,554,176 | 5/1951 | Edwards | 248/300 X |
| 2,588,596 | 3/1952 | Weber | 248/311.2 |
| 3,082,987 | 3/1963 | Robinson | 248/300 X |
| 3,572,818 | 3/1971 | Lohr | 297/399 X |

FOREIGN PATENT DOCUMENTS

| | | | |
|---|---|---|---|
| 83621 | 6/1980 | Japan | 248/503.1 |
| 571939 | 9/1945 | United Kingdom | 108/44 |

Primary Examiner—Alvin C. Chin-Shue
Attorney, Agent, or Firm—Turner Moller, Jr.

[57] ABSTRACT

A brace is secured to a console between a pair of front vehicular bucket seats. The brace extends downwardly and is captivated to the seat rails of the seats adjacent the console. In a preferred embodiment, the brace is trapped under the seat rails. In another embodiment, the brace is captivated by the nut-washer arrangement holding the seat rail to the vehicle floor. In one embodiment, the brace is of one piece construction and easily made by simply bending a length of aluminum strap. In another embodiment, the brace is of two piece construction.

9 Claims, 2 Drawing Sheets

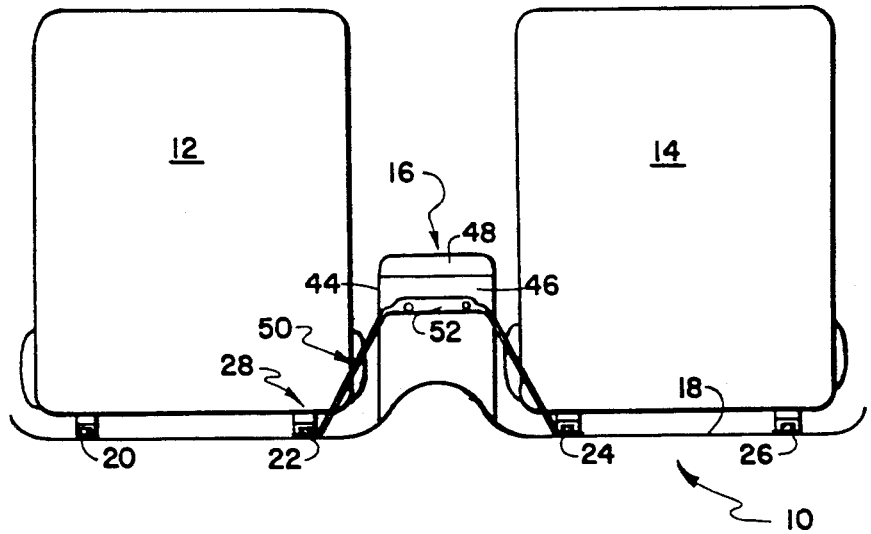
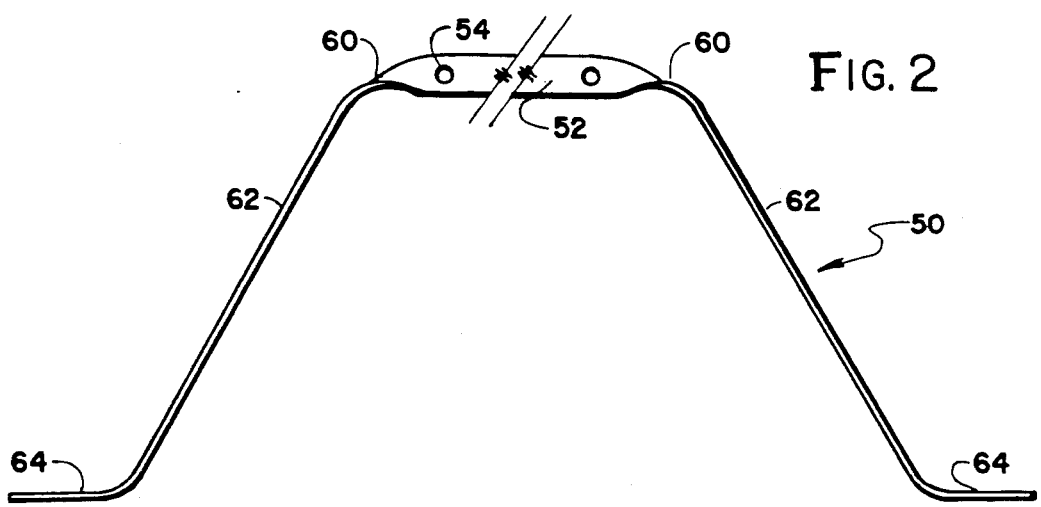

5,060,906

1

CONSOLE BRACE

This invention relates to a brace for a console positioned between bucket seats in the front of a vehicle.

There are a number of vehicles which include bucket seats spaced far enough apart to place a console between the seats. Such consoles typically include a receptacle secured to the vehicle floor and a hinged lid. Often, circular indentations are provided in the console to receive drink cans, coffee cups and the like. Such indentations are typically provided on the hinged lid or on a part of the stationary receptacle forward of the hinged lid. One of the difficulties with consoles of this type is that they are apparently difficult to mount to the vehicle floor in a secure, non-vibrating fashion. In particular, the consoles mounted on Chevrolet and GMC Suburbans and Blazers are prone to vibrate substantially thereby spilling liquids from cans, cups or glasses placed in the circular indentations provided in the console.

Although not suggested as solutions for this particular application, the provision of braces for storage containers mounted on the transmission hump of a vehicle are shown in U.S. Pat. Nos. 2,899,162; 3,022,883 and 4,371,138.

There are a number of difficulties that can encountered in devising a more secure mounting for the center console of vehicles. Presumably, one has to contend with cutting a hole in the rubber or carpet floor covering in the vehicle, cutting a hole in the metal floor board of the vehicle, tightening a nut or bolt or providing a back up for a nut and bolt underneath the vehicle and the like. As will be more fully apparent hereinafter, the approach of this invention does not require a fastener extending through the floor of the vehicle.

Another presumed difficulty with a console brace is that it must be out of the way and not provide any impediment to normal vehicle use. Preferably, the brace should be relatively inconspicuous.

To avoid these and other difficulties, the console brace of this invention comprises an elongate relatively rigid strap secured to the console receptacle and captivated between the seat rails adjacent the console. In a preferred embodiment of this invention, the brace connects to the rear, substantially vertical receptacle wall at a location intermediate the height of the wall and projects downwardly on each side of the console to lie under the adjacent seat rail. Conveniently, the brace is of an easily worked metal, such as aluminum, and is of rectangular crosssection. One flat section of the brace is secured to the receptacle wall in any convenient manner, as by drilling a small hole in the wall and placing a bolt therethrough. A twisted section connects the flat section to a downwardly extending section that terminates in a bend underlying the adjacent seat rail.

It is an object of this invention to provide a new and improved console brace for a vehicle.

Another object of this invention is to provide a console brace for a vehicle which is easy to install and which does not interfere with normal use of the vehicle.

Other objects and advantages of this invention will become more fully apparent as this description proceeds, reference being made to the accompanying drawing and appended claims.

IN THE DRAWING

FIG. 1 is a rear view of a console and bucket seat arrangement in a vehicle, showing the console brace of this invention, certain parts of the seat rail assembly being removed for clarity of illustration;

FIG. 2 is an enlarged view of the brace of this invention;

Figure 3:
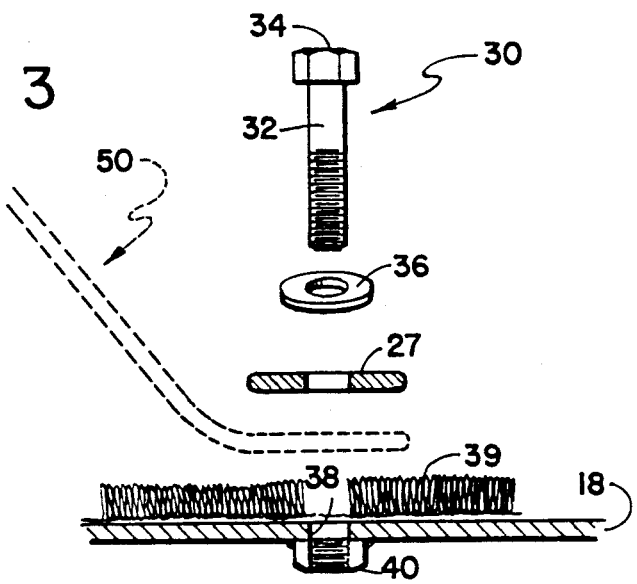
FIG. 3 is an exploded view of the connection between the seat rail and brace of this invention.

Referring to FIGS. 1–4, a vehicle 10 includes a pair of bucket seats 12, 14 spaced apart enough to receive a console 16 therebetween. The seats 12, 14 are each mounted on the floor 18 of the vehicle by a pair of rails 20, 22, 24, 26. An assembly 28 secures the rails 20, 22, 24, 26 to the floor 18 as shown best is FIG. 3. Each of the rails 20, 22, 24, 26 includes a central portion (not shown) elevated off the vehicle floor 18 and a pair of feet 27 secured to the floor 18 by a fastening assembly 28. The assembly 28 comprises a bolt 30 having a shank 32 and head 34 and captivates a washer 36 and the feet or rail end 27 to the floor 18 of the vehicle 10. Conventionally, the bolt shank 32 extends through an opening 38 in the floor 18 and carpet or floor covering 39 and is received in a nut 40 secured to the bottom of the vehicle 10 in any convenient manner, as by spot welding or the like.

Figure 4:
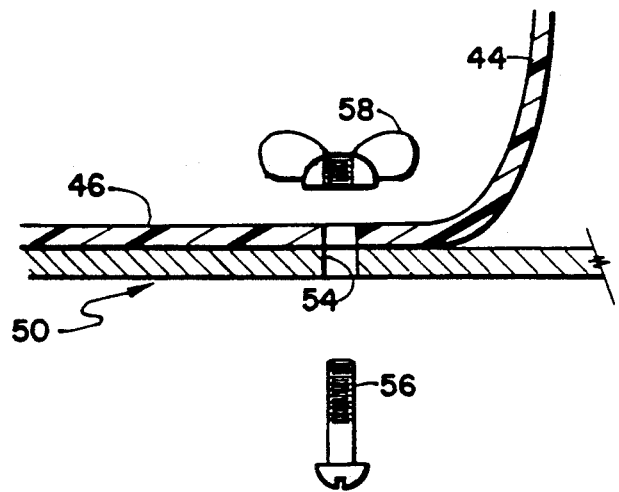
FIG. 4 is an enlarged cross-sectional view of the receptacle FIG. 1, taken along line 4—4 thereof as viewed in the direction indicated by the arrows.

As shown in FIGS. 1 and 4, the console 16 includes an open top receptacle 42 having generally parallel upright side walls 44 and a generally upright rear wall 46. The receptacle bottom is secured to the vehicle floor 18 in a conventional manner. The receptacle 42 includes a hinged lid 48. The lid 48 or the forward end of the receptacle 42 provide a series of circular indentations for receiving cups, cans, glasses or the like.

As suggested previously, the mounting between the receptacle and the vehicle floor 18 of some vehicles leaves something to be desired because the console 16 vibrates or jiggles substantially during travel over roads which are only slightly rough. Perhaps the original mounting between the receptacle 42 and the vehicle floor 18 was designed to accommodate loads occurring when travelling over smooth roads. Some types of vehicles, such as Suburbans and Blazers, are often used off the roads or on unpaved, relatively rough, roads. Under such use, the vibration or jiggling of the console 16 is noticeable and aggravating, particularly when liquids slosh out of cups, cans or glasses carried in the circular indentations in the console 16.

To overcome these problems, the brace 50 of this invention is provided. Although the brace 50 may be made of any suitable material, it is preferably made of an easily worked metal, such as aluminum. Desirably, the brace 50 is of square or rectangular cross-section and includes a central generally flat section or area 52 secured to the upright receptacle wall 46 in any suitable manner. Conveniently, a hole 54 is drilled in the brace 50 and in the wall 46. A bolt or screw 56 passes through the hole 54, engages a wing nut 58 or the like and captivates the brace 50 to the receptacle wall 46. Thus, the wide dimension of the brace 50 is parallel to the receptacle wall 46 in the vicinity of the central area 52.

As shown best in FIG. 2, the central flat area 52 of the brace 50 extends substantially across the width of the receptacle 42. Outboard of the receptacle 42, the brace 50 comprises a pair of twisted sections 60 which merge with a pair of downwardly inclined sections 62 in which the wide dimension of the brace 50 is facing upwardly or downwardly, as opposed for forwardly or rearwardly.

Near the extremities of the brace 50, the ends 64 are bent so the wide dimension is generally parallel to the vehicle floor 18. The ends 64 are captivated by the securing assembly 28 of the seat rails 22, 24 adjacent the console 16. In one embodiment, the brace ends 64 extend under the seat rail end 27 at a location spaced from the bolt 30 as shown in short dashed lines.

Installation of the brace 50 should now be apparent. The assemblies 28 on the seat rails 22, 24 are loosened by unthreading the bolts 30. The brace 50 is positioned so the ends 64 fit under the seat rail ends 27 and the central section 52 abuts the receptacle wall 46. Although the hole 54 in the brace 50 is conveniently drilled during manufacture, it may be done during assembly. An electric drill (not shown) is used to drill the hole 54 in the wall 46 and, if not done during manufacture, in the brace 50. The bolts 56 are installed and tightened, along with periodic tightening of the bolt 30 until all of the bolts are tight. Thus, the brace 50 is secured to the receptacle 42 and clamped under the adjacent seat rails 22, 24.

It will accordingly be seen that the brace 50 is simple to install, requiring only a wrench to loosen the bolts 30, an electric drill to drill the hole 54 and a screwdriver to tighten the machine screw 56. The brace 50 is simple to manufacture from a strip of aluminum stock, merely by twisting it to form the sections 60 and then bending the ends 64.

Figure 5:
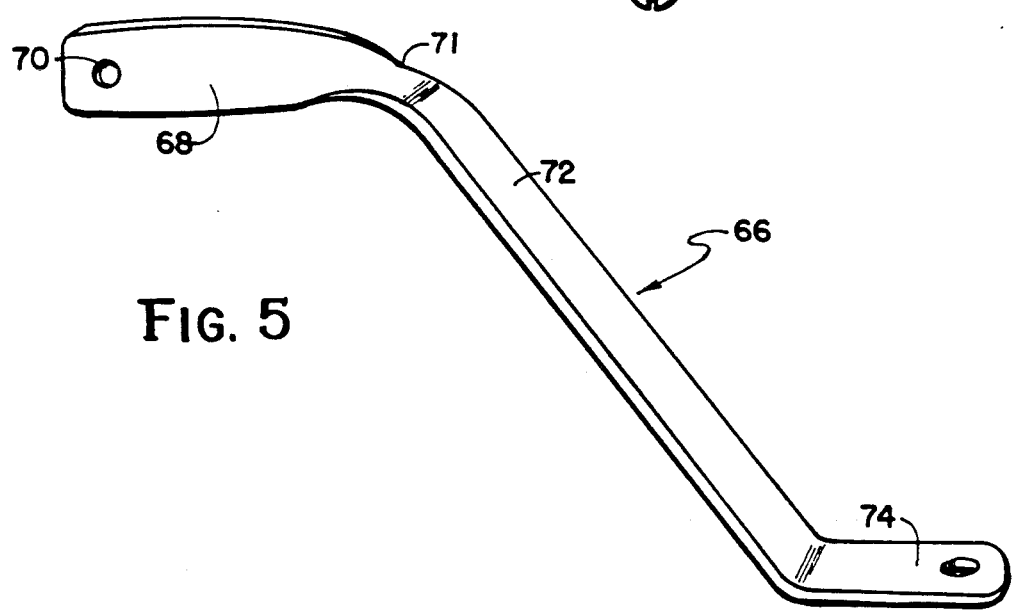
FIG. 5 is a pictorial view of another embodiment of the console brace of this invention.

The brace 50 is rather long and therefore somewhat limber. This makes packaging and shipping somewhat awkward. Referring to FIG. 5, a slightly modified brace 66 is illustrated. The brace 66 includes a flat section 68 having an opening 70 therethrough for receiving a bolt (not shown) for securing the brace to the receptacle 42. Thus, the flat section 68 corresponds to the central area 52 of the brace 50. A twisted section 71 connects the flat section 68 to a downwardly inclined section 72 which terminates in a brace end 74 corresponding to the brace end 64. Thus, a pair of mirror image braces 66 provide the same type support as the brace 50 and are easier to package and ship.

Manifestly, the braces 66 may be installed in the same manner as the brace 50. In the alternative, the braces 66 may be captivated to the fastening means 28 by placing the end 74 between the washer 36 and the rail end or foot 27, as shown in long dashed lines in FIG. 3.

The braces 50, 66 will be found to stabilize the console 16 and prevent it from vibrating or moving relative to the vehicle 10. The braces 50, 66 are easy to install and do not require drilling the vehicle floor board 18 or battling with the carpet or rubber floor covering inside the vehicle 10.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. In combination, a vehicle having a floor, a pair of spaced bucket seat assemblies comprising a pair of seats, first and second rails, means securing the rails to the floor comprising a bolt extending through the vehicle floor having a head thereon and a washer captivated between the head and the rail, and means mounting the seats for parallel movement on the rails in a forward and rearward direction, and a console between the seats comprising a receptacle, a lid and means connecting the receptacle to the floor, the improvement comprising a rigid brace, separate from the connecting means, having a first section secured to the receptacle and a second section captivated between the bolt head and the rial and rigid with the first rail.

2. The combination of claim 1 further comprising a second rigid brace having a first section secured to the receptacle and second section rigid with the second rail.

3. In combination, a vehicle having a floor, a pair of spaced bucket seat assemblies comprising a pair of seats, first and second rails, means securing the rails to the floor and means mounting the seats for parallel movement on the rails in a forward and rearward direction, and a console between the seats comprising a receptacle, a lid and means connecting the receptacle to the floor, the improvement comprising a rigid brace, separate from the connecting means, having a first section secured to the receptacle and a second section captivated between the first rail and the vehicle floor and rigid with the first rail.

4. In combination, a vehicle having a floor, a pair of spaced bucket seat assemblies comprising a pair of seats, first and second rials, one of the rails including a foot having an opening therethrough, means securing the rails to the floor including a bolt extending through the foot opening and securing the foot to the floor, and means mounting the seats for parallel movement on the rails in a forward and rearward direction, and a console between the seats comprising a receptacle, a lid and means connecting the receptacle to the floor, the improvement comprising a rigid brace, separate from the connecting means, having a first section secured to the receptacle and a second section rigid with the first rail and comprising an end captivated between the rail foot and the vehicle floor.

5. In combination, a vehicle having a floor, a pair of spaced bucket seat assemblies comprising a pair of seats, first and second rails, means securing the rails to the floor and means mounting the seats for parallel movement on the rails in a forward and rearward direction, and a console between the seats comprising a receptacle, a lid and means connecting the receptacle to the floor, the improvement comprising a rigid brace, separate from the connecting means, having a first section secured to the receptacle, a second section rigid with the first rail and a third section rigid with the second rail, comprising a one piece metallic strap having a central segment comprising the first brace section and a pair of ends comprising the second and third brace sections.

6. In combination, a vehicle having a floor, a pair of spaced bucket seat assemblies comprising a pair of seats, first and second rails, means securing the rails to the floor and means mounting the seats for parallel movement on the rails in a forward and rearward direction, and a console between the seats comprising a receptacle, a lid and means connecting the receptacle to the floor, the improvement comprising a rigid brace, separate from the connecting means, having a first section secured to the receptacle and a second section rigid with the first rail, the brace comprises a metallic member having a central relatively flat segment comprising the first section, a pair of downwardly inclined sections extending from adjacent the central segment, a pair of twisted sections connecting the central segment to the inclined sections, and first and second ends inclined at an obtuse angle relative to the downwardly inclined sections, the first end comprising the second section rigid with the first rail and the second end being rigid with the second rail.

7. The combination of claim 6 wherein the receptacle comprises an upright rear wall, the central flat brace area abuts the rear wall along a substantial part thereof and further comprising a threaded fastener extending through the rear wall securing the brace to the receptacle.

8. The combination of claim 7 wherein the rail includes a foot having an opening therethrough and the rail securing means includes a bolt extending through the foot opening and securing the foot to the floor, the first brace end being captivated between the rail foot and the vehicle floor.

9. In combination, a vehicle having a floor, a pair of spaced bucket seat assemblies comprising a pair of seats, first and second rails, means securing the rails to the floor comprising first means securing the first rail to the floor and second means securing the second rail to the floor, means mounting the seats for parallel movement on the rails in a forward and rearward direction, and a console between the seats comprising a receptacle, a lid and means connecting the receptacle to the floor, the improvement comprising a rigid brace, separate from the connecting means, having a first section secured to the receptacle and a second section rigid with the first rail, the first securing means captivating the first rail and the second brace section together.

* * * * *